May 21, 1929.                L. E. WHITON                1,713,799
                              LATHE CHUCK
                  Filed March 22, 1926      3 Sheets-Sheet 1

INVENTOR
Lucius E. Whiton
BY
ATTORNEY

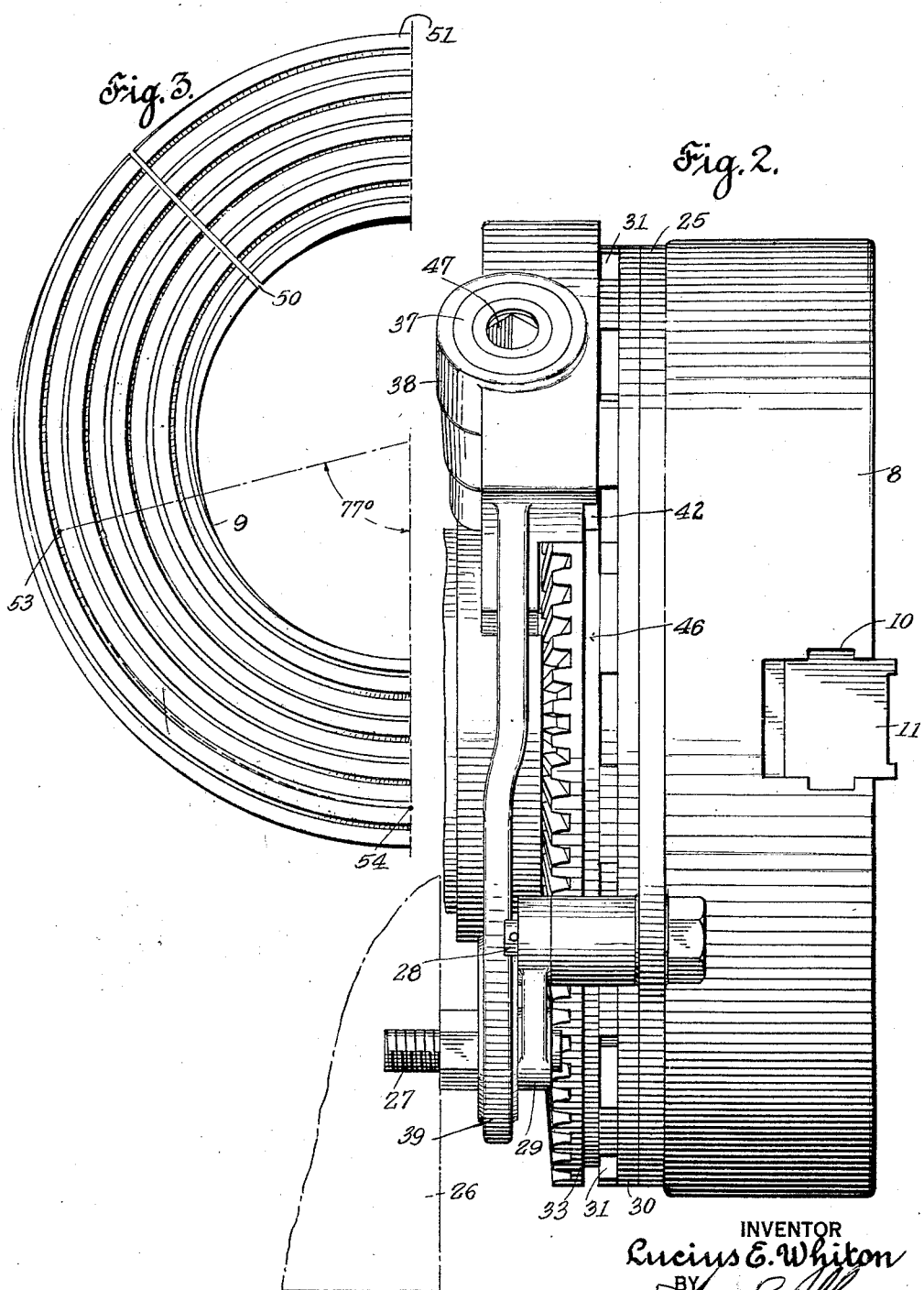

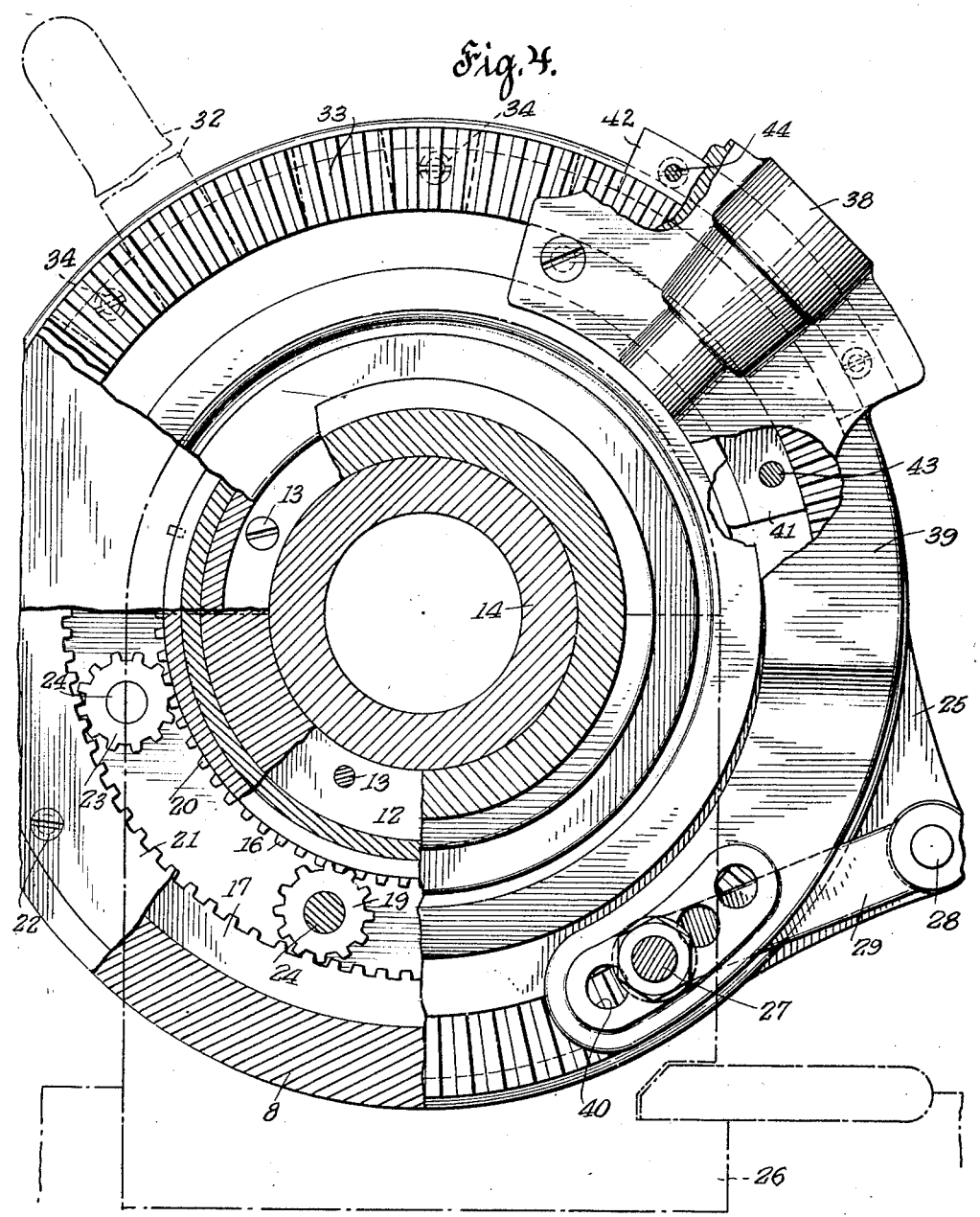

Patented May 21, 1929.

1,713,799

UNITED STATES PATENT OFFICE.

LUCIUS E. WHITON, OF NEW LONDON, CONNECTICUT.

LATHE CHUCK.

Application filed March 22, 1926. Serial No. 96,463.

My invention relates particularly to what are sometimes termed automatic chucks which can be adjusted for gripping or releasing the stock while it is rotating.

One object is to provide a construction of this character which grips the stock firmly and positively without any back-lash or play in the parts.

Another object is to provide for convenient adjustments by a hand-lever or alternately by a wrench, irrespective of whether the chuck body is revolving or stationary.

Another object is to provide a construction which can be adjusted so as to bring the control mechanism into position convenient for the operator.

Another object is to provide a compact, powerful construction of this character, the parts of which are so arranged as to permit the stock or back-facing tools to be fed through the lathe spindle without obstruction.

In carrying out the invention I utilize certain principles which are broadly claimed in my former applications Nos. 61,173 filed Oct. 8, 1925 and 77,933 filed Dec. 28, 1925. In the present construction, however, the scroll plate is split radially so as to be resiliently expansible and contractible, and provided with wedge-like teeth so that it automatically takes up any play between the adjacent parts. The adjusting member for controlling relative movements of the planetary members is provided with sockets for an operating lever and also provided with an adjusting operator, the position of which is adjustable circumferentially to bring it to a convenient position. Details of the preferred construction and arrangements will be understood from the accompanying three sheets of drawings.

Fig. 2 is a side view of the mechanism showing in dot-and-dash lines a fragment of the head stock serving as an anchorage.

Fig. 3 is a front view of one-half of the scroll plate.

Fig. 4 is a view of the chuck from the rear, some parts being broken and other parts being shown in section for illustrative purpose.

Figure 1:
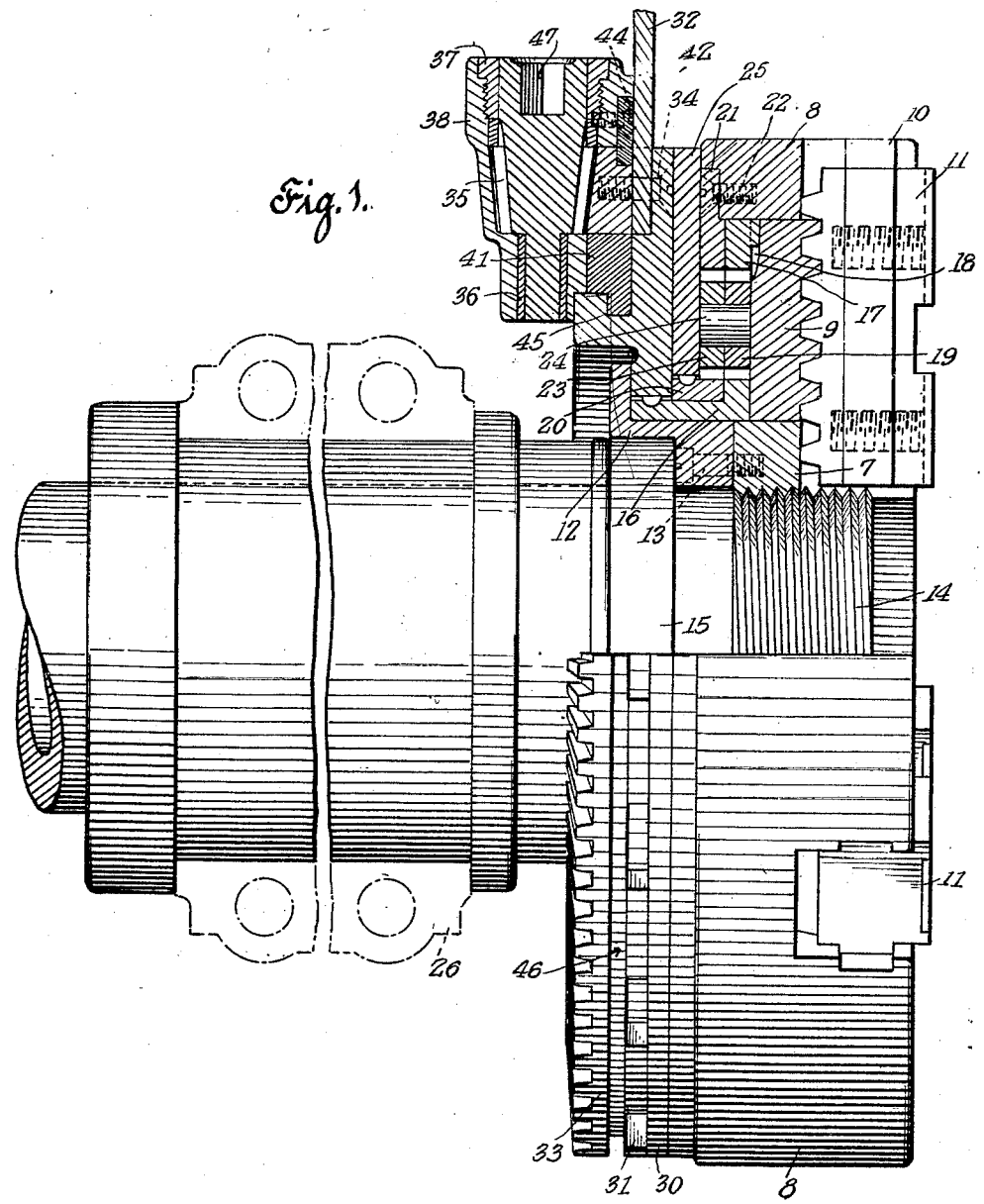
Fig. 1 is a longitudinal section and side elevation of a chuck involving my present invention and showing a part of the lathe spindle.

The chuck body may be of any suitable material with a central part or hub 7 and an outer rim or flange 8. The scroll plate 9 is mounted within the body between the outer wall of the hub 7 and the inner wall of the flange 8. The body is provided with a number of radial slots 10 for the jaws or jaw bases 11. For convenience in manufacture and assembly, the hub is formed of two parts, the rear part 12 being secured to the front part 7 by a number of screws 13. The hub 7 is preferably threaded internally to fit the thread end of the spindle 14, and the spindle is provided with a shoulder 15 against which a part of the hub 12 fits when the parts are properly assembled.

On the hub is mounted a sleeve or ring 16 having teeth which extend outwardly. A gear ring 17 has teeth facing toward the teeth of the gear 16. This gear ring 17 is secured to the scroll plate 9 so as to rotate with it. For convenience in manufacture and assembly the connection between 17 and 9 is effected by clutch teeth 18. Between the gears 16 and 17, I mount a series of pinions 19. Alongside of the gear 16 and on its hub I mount a gear ring 20 having teeth corresponding to the teeth on 16. A gear ring 21 corresponding to gear ring 17 is secured to the flange of the body of the chuck by screws 22. Between gears 20 and 21 is mounted a series of pinions 23 corresponding with the pinions 19, and in fact having common shafts or studs 24 on which they can relatively rotate. A disc or plate 25 which is normally stationary or fixed, serves as one guide wall for these pairs of pinions and their studs or shafts, while the scroll plate 9 serves as the other guide wall. The gear ring 20 is keyed or otherwise suitably secured to the disc 25. These parts are so constructed and arranged that no additional spider or support is required for the shaft 24.

The head stock 26 or frame of the lathe carries a stud 27. Another stud 28 is secured to the disc 25 and the two studs are connected by a link 29 so that the position of the disc 25 is normally fixed by the location of the stud 27 in the head stock of the machine.

The adjusting disc 30 is keyed to the hub of the gear 16 and rotatable against one face of the stationary disc 25. This adjusting disc 30 is provided with a series of recesses 31 adapted to receive the inner end of a hand lever 32 so as to facilitate the rotation of the adjusting disc by hand. The bevel gear 33 is secured to the disc 30 by screws 34 so that the bevel gear is a part of the adjusting member. A bevel pinion 35 meshing with the gear 33, has bushings 36 and 37 in the housing 38. This housing has an extension arm 39 provided with a series of holes 40 adapted to receive the stationary stud 27. This housing is supported or interlocked with the bevel gear 33 so as to hold the pinion and gear in mesh. The interlock is effected by arc-shaped segments 41 and 42 which are secured to the housing by screws 43 and 44. The segment 41 fits against the inner edge of the gear 33 and has a flange which has a sliding fit in the groove 45 in the hub of the adjusting member. The segment 42 has a sliding fit in the groove 46 in the outer edge of the gear 33. The bevel pinion 35 is provided with a socket 47 for the ordinary wrench or the pinion may be driven in any other ordinary manner.

Ordinarily, when the chuck is in operation, the discs 25 and 30 are stationary so that the gears 20 and 16 are likewise stationary, and the pairs of pinions 23 and 19 rotate freely as they are revolved and carried around by the rotation of the chuck body and scroll plate. When it is desired to tighten or loosen the jaws of the chuck, it is simply necessary to turn the member 30 with respect to the member 25. This causes the pinions 19 to rotate on the shafts 24 relative to the pinions 23. This relative rotation of the pinions 19 and 23 compels the gear ring 17 to rotate with respect to the gear ring 21 and consequently rotates the scroll plate with respect to the chuck body, thus moving the jaw bases 11 in or out, as the case may be, a distance determined by the relative rotation of the adjusting member 30 with respect to the stationary disc 25.

The scroll plate 9 instead of being rigid in the customary manner, is provided with a slot 50 cut entirely through the wall of the metal so as to permit the scroll plate to spring slightly outward or inward when the jaws are tightened on the work. The scroll plate thus expands or contracts, as the case may be, into rigid contact or engagement with the inner surface of the outer flange 8 of the chuck body or the outer surface of the hub 7 of the body as the jaws are contracted or expanded with respect to the work. The thread 51 on the scroll plate instead of being rectangular in cross-section, as is usual, is wedge-shaped or slightly beveled, as shown in Figs. 1 and 3, and the teeth on the jaw base are correspondingly shaped. The relative pitch and wedge-shaped inclination of the scroll teeth is preferably such that there is an angle of approximately 77° between the point 53 at the bottom of the scroll thread and a point 54 on the top of the thread, these points being at the same distance from the center of the scroll plate. This represents the path of a point lifted up from the bottom to the top of the scroll thread as the scroll is revolved. Thus the revolution of the scroll plate and its angular scroll thread coacting with the corresponding teeth on the jaws or jaw bases produces an axial end thrust along the inclined plane 77° in length. The effect of this end thrust along this inclined plane is to produce a wedging action tending to separate the scroll plate and the jaws, and causing a secure end-wise locking of the scroll plate within the chuck body against the planetary gears, the fixed disc 25, and the revolving members 16 and 30. The result is not only to grip the jaws securely on the work when the pressure is applied, but also to expand or contract the scroll plate rigidly against the corresponding members of the chuck body, and also to exert end thrust so as to take up all back-lash in the parts. In other words, a structure is provided which, when clamped, is rigidly secured not only at the contact between the scroll plate and the jaws but also against all the running bearings so that the looseness incident to bearings which are capable of free revolution when the chuck is released, will be taken up by the process of tightening the chuck upon the work.

The construction described provides mechanism which may be tightened if required either by means of the hand lever 32 for medium gripping power upon light pieces or by means of a geared or more powerful grip through the action of the pinion 35.

The position of the pinion may be adjusted to suit the convenience of the operator by engaging the stud 27 in one of the various holes 40 in the arm 39.

If the chuck is to be used so as to require powerful gripping, the wrench (not shown) may be left in the socket 47 of the pinion 35, since the housing 38 is stationary. If the work to be done is of a lighter nature where powerful gripping is not required, the wrench may be removed and the flat hand lever 32 may be inserted in any one of a series of recesses 31 convenient for the operator.

Since none of the parts project into the center of the chuck body, it is obvious that the material to be treated may be fed through the usual hollow spindle, and back-facing tools may be fed through the spindle if desired.

It should also be noted that the construction is such that the radial travel of the jaws is limited only by the diameter so that the chuck may be used on work of widely varying size.

I claim:

1. A chuck comprising a body, a one piece rotary scroll plate mounted therein and jaws guided in said body and movable by the rotation of said scroll plate, said scroll plate being radially split and resiliently expansible so as to permit its expansion when in use.

2. A chuck having a body with jaws, a split and resiliently expansible scroll plate for adjusting said jaws, and means for rotating said plate relatively to said body while the body is rotating.

3. A chuck comprising a body with adjustable jaws, means for adjusting said jaws while said body is in motion, said means including a split and resiliently expansible scroll plate, a bevel gear, and a bevel pinion meshing therewith, means guided by said gear for supporting said pinion, and means for rotating said scroll plate with respect to the chuck body upon rotation of the bevel pinion.

4. A chuck comprising a body, jaws adjustable therein, means for adjusting said jaws while the body is in motion, including a split and resiliently expansible scroll plate, an adjusting member having means for rotating it, a planetary train between said adjusting member and said plate, and reducing gear mechanism connected to said adjusting member.

5. A chuck comprising a body, jaws guided therein, a split and resiliently expansible and contractible scroll plate for adjusting said jaws, two discs, a planetary gear train connected between said body and said scroll plate on the one side and said discs on the other side, means for supporting one of said discs in a fixed position, planetary means for rotating the other disc at will while the first disc is stationary, and an adjustable support for part of said means for rotating said disc.

6. A chuck body having a hub, a slotted face and a flange, jaws in said face, a split and resiliently expansible scroll plate fitted on said hub within said flange behind said face and having a wedge-like thread engaging corresponding grooves and teeth in said jaws, and means for rotating said scroll plate in said body.

7. A chuck comprising a stationary plate, an adjusting member, a body having guideways with jaws movable therein, a split and resiliently expansible scroll plate mounted in the body and having a wedging thread engaging corresponding teeth on the jaws, and a planetary gear train connecting said body and scroll plate with said stationary plate and adjusting member, and including pairs of coaxially mounted pinions traveling between said scroll plate and said stationary plate.

8. A chuck comprising a body with adjustable jaws, means for adjusting said jaws while said body is in motion, said means including a gear member and a pinion meshing therewith, a housing for supporting said pinion, said gear member having a circumferential groove and arc-shaped segments secured to said housing and guided in said groove in said gear member.

9. A chuck comprising a body, a series of jaws movable therein, a rotatable operator for said jaws, annular gears secured to the chuck body and to the operator respectively, two spur gears within the annular gears, a pair of planetary pinions having a common stud between the spur gears and the annular gears, a relatively stationary plate connected to one spur gear, a rotatable gear member connected to the other spur gear, a driving pinion for said rotatable gear and a bearing for said driving pinion secured to said stationary member.

10. In a chuck, a body having radially movable jaws, a split and resiliently expansible scroll plate having a spiral thread whose sides are inclined and in mesh with the jaws and a differential planetary gear train connecting the body and scroll plate for giving a relative rotation of the scroll plate in the body while the body is rotating.

11. A chuck comprising a body, a series of radially movable jaws guided therein, a radially split and resiliently expansible scroll plate having a wedge-like spiral thread engaging said jaws, annular gear rings connected respectively to the chuck body and to said scroll plate, spur gears mounted concentrically with said gear rings, two discs mounted side by side and connected respectively to said spur gears, a series of pairs of planetary pinions meshing with said gear rings and said spur gears and guided between said scroll plate and one of said discs, one of said discs being relatively stationary and reduction drive mechanism for rotating the other disc.

12. A chuck comprising a body, radially movable jaws mounted therein, a flanged gear member secured to said body and providing a bearing surface, two spur gears one of which is supported on said bearing surface, a member for normally holding the other gear relatively stationary, an adjusting member connected to the first mentioned gear, a bevelled gear secured to said adjusting member, a housing mounted upon and supported by said adjusting member, a bevelled pinion carried by said housing and meshing with said bevelled gear, said housing being circumferentially adjustable on said adjusting member, annular gear rings mounted concentrically with said spur gears, a series of pairs of planetary pinions mounted to travel between said gear rings and said spur gears, means for securing one of said gear rings to the chuck body and a jaw adjusting member connected to the other gear ring.

LUCIUS E. WHITON.